Dec. 23, 1924.  
E. KAUFMANN  
1,520,249  
AIR PUMP ATTACHMENT FOR AUTOMOBILES  
Filed June 27, 1921
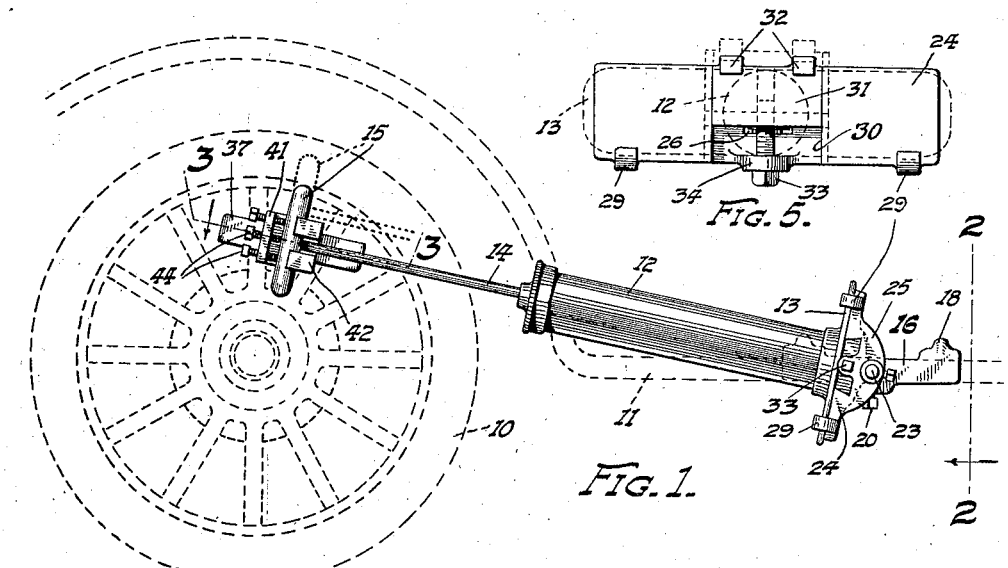
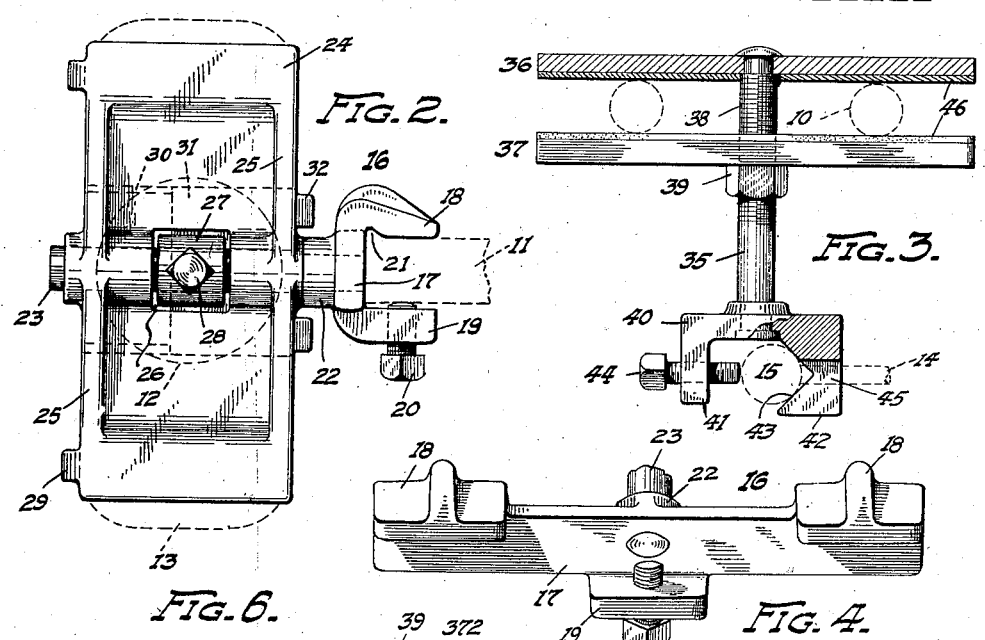
Witness:  
Inventor:  
Elmer Kaufmann.  
By:  
Erwin, Wheeler & Woolard  
Attorneys.

Patented Dec. 23, 1924.

1,520,249

UNITED STATES PATENT OFFICE.

ELMER KAUFMANN, OF MILWAUKEE, WISCONSIN.

AIR-PUMP ATTACHMENT FOR AUTOMOBILES.

Application filed June 27, 1921. Serial No. 480,586.

*To all whom it may concern:*

Be it known that I, ELMER KAUFMANN, a citizen of the United States, and a resident of the city of Milwaukee, county of Milwaukee, and State of Wisconsin, have invented certain new and useful Improvements in Air-Pump Attachments for Automobiles; and I do declare the following to be a full, clear, and exact description thereof, such as will enable others skilled in the art to which the invention relates to make and use the same, reference being had to the accompanying drawings for a disclosure as to the construction of one embodiment of the invention.

My invention relates to an improved construction whereby an ordinary hand pump, such as usually comprises a part of an automobile equipment, may be readily connected so as to be operated by power drawn from the automobile.

The work of inflating the pneumatic tires of a motor vehicle by means of an ordinary hand pump is very laborious and it is often quite difficult to compress the air to the desired degree. Failure to do so, has a destructive influence upon the tires.

My invention comprises an economical attachment which may be used to connect an air-pump to a fixed part of the automobile, as the running board, so that the pump may be operated from a crank pin readily and adjustably secured in position upon one of the driving wheels of the car.

The details of my improved construction will be described hereinafter, and pointed out in the appended claims.

In the accompanying drawings,

Figure 1 is a view in elevation showing in dotted lines the rear, right hand side of an automobile, with my improved pump connecting mechanism shown in position.

Fig. 2 is a sectional view looking in the direction of the arrow 2—2, Fig. 1, and showing the swivelled clamp for receiving the foot of the air-pump, and the manner of connecting the clamp to the foot board of the automobile.

Fig. 3 is a plan view, partly in section, on the line 3—3, Fig. 1, showing the crank pin as supported in position by a spoke clamp, also the swivelled head which is connected to the handle of the pump.

Fig. 4 is a perspective view looking from the inside, showing the clamp connecting the parts to the running board.

Fig. 5 is a detail of the swivelled head of the clamp for holding the foot of the pump in position.

Fig. 6 shows a modified form of the clamp for securing the crank to the spokes of the driving wheel.

Referring to the drawings, the numeral 10 indicates one of the rear or driving wheels of an automobile of common construction, and 11 indicates the foot or running board thereof. These parts being well known, are sufficiently illustrated in dotted lines upon the drawing.

12 indicates the cylinder of an ordinary hand pump, such as comprises a part of the usual equipment of an automobile, such cylinder being provided with a foot 13, a piston rod 14, and a handle 15.

A clamping member 16, constructed as a plate 17, having spaced lugs 18 upon its upper edge, and an intermediate lug 19 on its lower edge, is adjustably positioned upon the running board, the plate 17 resting against the edge thereof, with the lugs engaging the upper and under sides, as shown in Fig. 2. A set screw 20, passing through the lug 19, bears upon the under side of the running board, and holds the clamping member 16 in the position to which it has been adjusted. It will be observed that the lugs 18 are undercut at the angle of their junction with the plate 17, so as to provide a notch 21 for the clearance of a rib or bead which is present in certain types of running boards.

The plate 17 is provided midway of its length with a boss or bushing 22, which affords a seat for the fixed post 23, so that the post 23 extends laterally in the plane of the running board. The swivelled block 24, formed to receive the foot 13 of the pump is provided at its rear side with ribs 25, which are bored so as to form journals for the reception of the post 23. The said block 24 is provided also with an opening 26 between the journals, to provide space for a collar 27, which is adjustably secured to the post by means of a set screw 28. The block 24 may therefore be adjusted along the said post, to adapt it to running boards of different widths, so that the pump supported upon the swivelled block 24, may be brought into line with the swivelled head of the crank pin which is attached to the driving wheel of the automobile.

At its other or face side the swivelled block 24 is provided with spaced lugs 29, at one side thereof. The said block 24 is also transversely recessed and undercut as at 30, for the reception of a slide 31 provided with lugs 32, oppositely arranged and corresponding to the lugs 29. A screw 33 passed through a lug 34 on the block 24, in line with the lugs 29 thereon, is threaded into the slide 31 and serves to draw the lugs 32 toward the lugs 29. By means of the construction just described, the foot 13 of the pump may be quickly clamped in position upon the block 24 of the clamp 16, which latter, as previously stated, is secured upon the running board.

The crank pin 35 is intended to be placed between the spokes of a wheel, and will have such free radial adjustment as will accommodate the throw thereof to the stroke of the pump. The crank pin 35 is held in position by means of two clamping bars 36 and 37, the end of the crank pin being preferably secured to the bar 35 in an opening formed therein. The crank pin is threaded for a portion of its length as at 38. The threaded portion receives an adjusting nut 39, which bears upon the outer clamping bar 37, and by means of which nut 39 the crank pin may be held in any desired position of adjustment.

The swivelled head 40 is attached at the outer end of the crank pin 35. The said head 40 is provided with jaws 41 and 42, the latter being notched as at 43 for the reception of the handle 15 of the pump. One or more clamping screws 44 passes through the jaw 41 and bear upon the said handle 15 and holds the latter firmly in the position in which it has been placed. The jaw 42 is notched as at 45 for the reception of the piston rod of the pump.

In operation, one of the driving wheels will be jacked up, and the pump will be secured in the desired position by means of proper positioning of the several clamps. Air will be conducted by means of an ordinary flexible tube to the valve stems of the wheels which rest upon the ground and the tires will be inflated. If it be desirable to inflate the tire of the wheel which has furnished the motive power in the first instance, it will be necessary to rest such wheel upon the ground and jack up the other driving wheel, using the latter for the purpose indicated.

In cases where the pump forming a part of the automobile equipment has a stroke which is less than the diameter of the brake drum attached to the wheel, it will be feasible to provide the outer spoke clamping bar 370 with an inward extension 371, Fig. 6, which projection will carry the crank pin 35 as before, the nut 39 in this case working upon a clamping bolt 372 to hold the clamping bars in position upon the spokes of the wheel. The clamping bars are preferably provided with a resilient facing 46 of rubber, leather or felt, to avoid marring the finish of the car.

From the foregoing it will be seen that I have produced an air-pump attachment for automobiles which is easily applied in position, and furnishes a convenient means for inflating pneumatic tires without the expenditure of physical effort.

Having thus described my invention, what I claim and desire to secure by Letters Patent of the United States, is:

1. Means for attaching a pump to an automobile, such means comprising a plate adapted to bear against the edge of the running board and having lugs extending over one side of the same, means upon the plate at the other side of the running board to effect engagement of the said lugs with the running board and secure such plate in position, and a post extending laterally from the plate, in combination with a transversely recessed block swivelled upon the said post, means upon the said block for clamping the foot plate of the pump thereto, such means comprising lugs at one side of the block and a slide movable in the transverse recess, the slide also being provided with lugs, and means for moving the slide to engage and hold the foot plate upon the said block.

2. Means for attaching a pump to an automobile, such means comprising a plate adapted to be attached to the running board, and a post extending laterally from the said plate, in combination with a transversely recessed block pivotally mounted upon the said post, means upon the said block for clamping the foot plate of the pump thereto, such means comprising engaging lugs at one side of the block and a slide movable in the transverse recess, the slide also being provided with engaging lugs, and means for moving the slide to clamp the foot plate upon the block.

3. Means for attaching a pump to an automobile, such means comprising a plate adapted to be attached to the running board, and a post extending laterally from the said plate in combination with a transversely recessed block pivotally mounted upon the said post, means for holding the block in adjusted position, longitudinally upon the post, means upon the said block for clamping the foot plate of the pump thereto, such means comprising engaging lugs at one side of the block and a slide movable in the transverse recess, the slide also being provided with engaging lugs, and means for moving the slide to clamp the foot plate upon the block.

In testimony whereof, I have signed my named at Milwaukee, this 22d day of June, 1921.

ELMER KAUFMANN.

Witnesses:
W. F. WOOLARD,
A. C. EIERMAN.